United States Patent [19]

Corless

[11] Patent Number: 4,547,629
[45] Date of Patent: Oct. 15, 1985

[54] ENERGY MANAGEMENT CIRCUIT

[75] Inventor: Robert W. Corless, San Jose, Calif.

[73] Assignee: Comdial Technology Corporation, Sunnyvale, Calif.

[21] Appl. No.: 577,105

[22] Filed: Feb. 6, 1984

[51] Int. Cl.[4] .................... H04M 19/00; H02J 7/00
[52] U.S. Cl. ............................ 179/81 R; 320/22; 365/229; 179/2 BC
[58] Field of Search ............. 179/81 R, 84 R, 2 BC; 307/66, 86; 365/229; 320/22, 24, 39

[56] References Cited

U.S. PATENT DOCUMENTS

| | | | |
|---|---|---|---|
| 4,197,425 | 4/1980 | Secrett et al. | 179/2 BC |
| 4,467,265 | 8/1984 | Hierholzer, Jr. | 320/24 X |

Primary Examiner—James L. Dwyer
Attorney, Agent, or Firm—Townsend and Townsend

[57] ABSTRACT

An energy management circuit for use in a telephone or other device which includes an electronic memory is disclosed. The invention provides a capacitive keep alive power supply to maintain said memory in an active condition during extended periods when the device is disconnected from a line power source, as in a telephone on-hook condition. A large capacitor charge is maintained within a predetermined voltage range during such disconnect conditions by a resistively coupled trickle charge power source. A comparator is operated to monitor capacitor charge and to produce a control signal when the voltage at the capacitor falls below a selected memory keep alive level. The control signal operates a switch to bypass the trickle charge circuit. The switch couples line power directly to the capacitor to charge the capacitor to a voltage sufficient to maintain memory contents intact. A switch inhibit circuit is provided to prevent trickle charge bypass during an inadequate or excessive line voltage condition. A sleep timer circuit is also provided to conserve energy required to operate the present invention by allowing the invention to operate periodically and only for short intervals.

10 Claims, 3 Drawing Figures

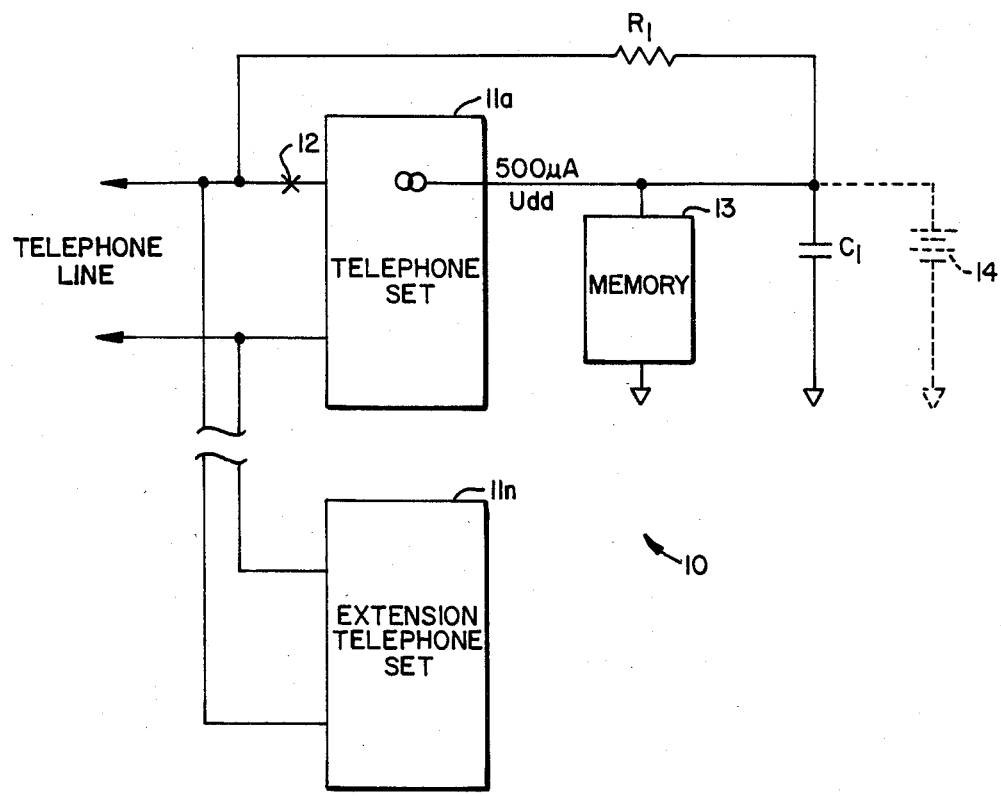
FIG._1.   *PRIOR ART*
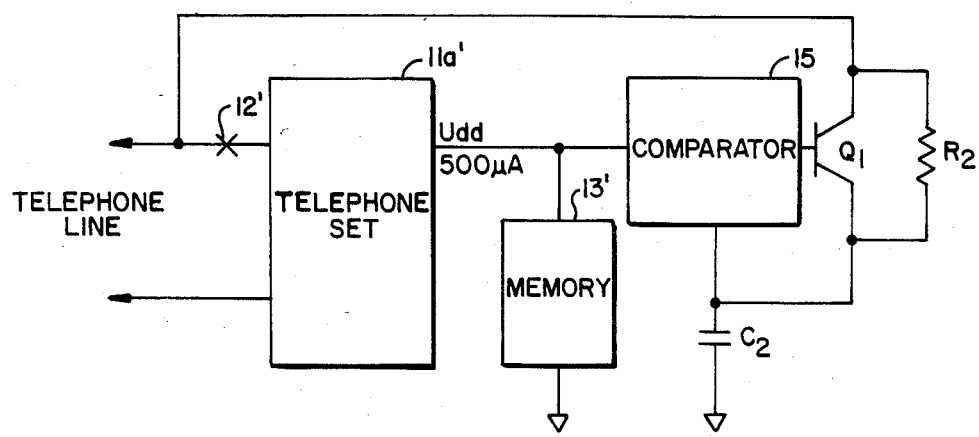
FIG._2.

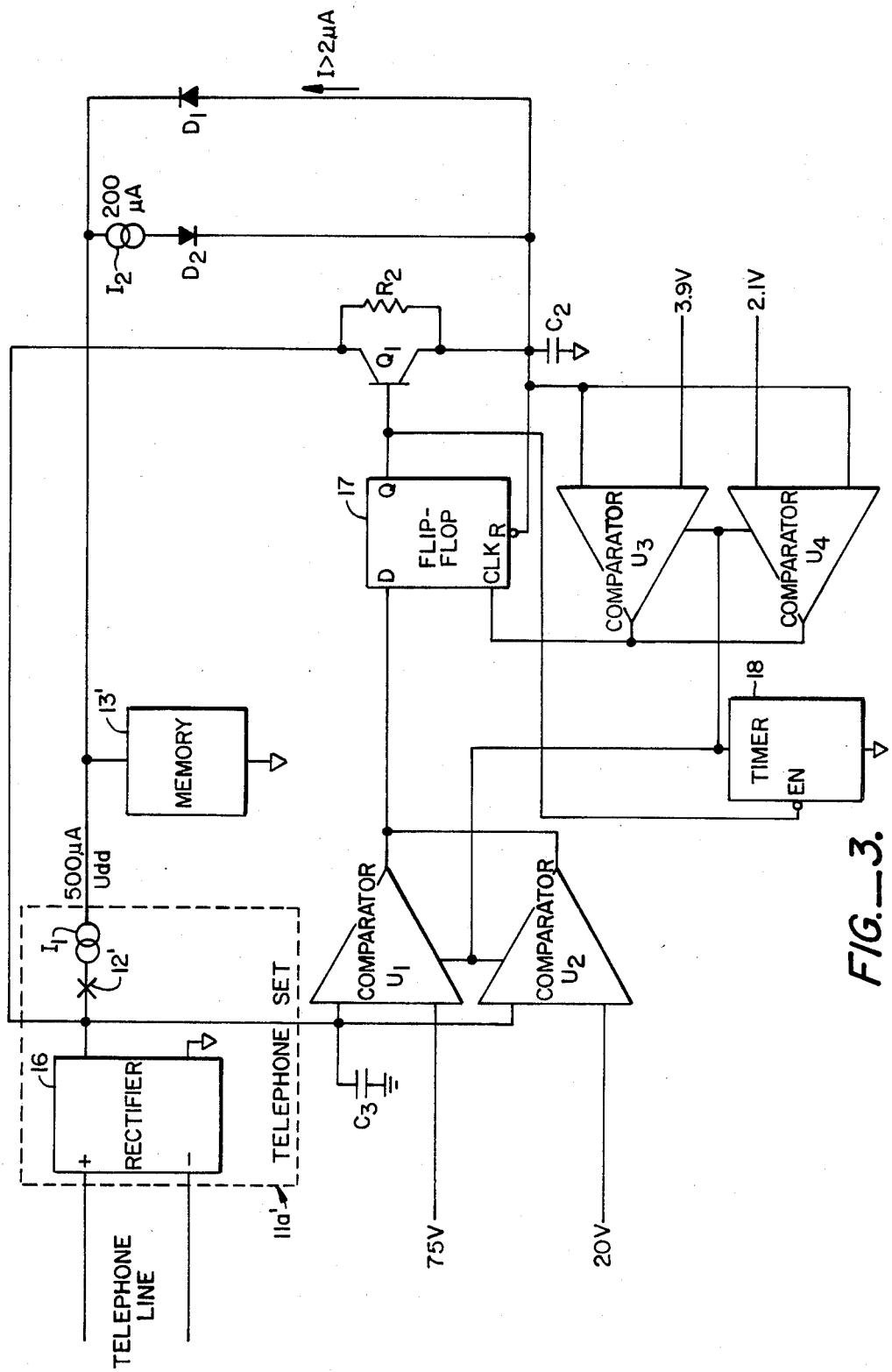
FIG._3.

ENERGY MANAGEMENT CIRCUIT

BACKGROUND OF THE INVENTION

1. Field of the Invention

The present invention relates to a keep-alive backup power supply for a volatile electronic memory. More particularly, the present invention relates to an energy management circuit for maintaining a solid-state electronic memory in an active condition according to predefined circuit parameters and in response to various modes of circuit operation.

2. Description of the Prior Art

Variable or programmed data are stored in electronic devices in solid-state electronic memory arrays. Because such memory arrays are composed of volatile devices, a constant source of power must be supplied to the memory arrays to retain data entered therein in the memory. It is well known to provide a backup power source for such memory arrays to retain data in the event of a main power source failure. In this way, important information in the form of data is maintained intact during power outages or other power source interruptions.

One common electronic device incorporating solid-state memory is the telephone. Telephone numbers, access codes, etc. are now stored as data in electronic memory arrays. FIG. 1 shows a typical prior art telephone installation 10 including a first telephone circuit 11a and another of any number of extension telephone circuits 11n.

Telephone circuit 11a is coupled to the telephone line through an on-hook/off-hook switch 12. The telephone circuit provides a power bus Udd for powering dialing devices and other such devices which incorporate memories, such as memory device 13. When the phone is off-hook (in use), power from the line is connected through the telephone circuit 11a over power bus Udd to the dialing or other memory device 13. In this way, the device is kept active and data therein is maintained intact. A capacitor C1 may be included for accumulating a "keep alive" charge during the off-hook interval or alternately, a battery 14 may be provided as a backup memory power source. When the phone is placed on-hook (not in use), a trickle charge of no more than 5 microamperes is provided through resistor R1 to trickle charge capacitor C1 or battery 14.

A disadvantage of the prior art memory keep alive arrangement is that the amount of current provided to trickle charge the capacitor is usually insufficient to maintain the capacitor with an adequate charge to keep device 13 active over a long period of time. This problem is exacerbated if another extension, such as telephone circuit 11n is used. Such use draws power from the line and therefore provides less current through resistor R1 to trickle charge the capacitor.

The addition of a very large capacitor or battery for storing larger amounts of current during the off-hook condition provides no solution to the problem of keeping a solid state memory alive during the on-hook condition. The amount of trickle charge current provided by resistor R1 is too insignificant to fully charge the large capacitor or a rechargeable battery. Accordingly, loss of memory contents in such device is a significant problem which has heretofore remained unsolved in the art. The most common, though far from ideal, solution to this problem is to provide a backup battery which requires routine replacement. Such a battery adds to the expense of the device and yet it is still unable to keep the memory contents from being lost during equipment service and battery replacement intervals.

SUMMARY OF THE INVENTION

The present invention is an energy management circuit for use in a telephone or other device which includes an electronic memory. The invention provides a capacitive backup power supply for maintaining a solid-state memory in an active condition during extended periods of on-hook telephone operation in multi-extension environments.

A very large capacitor on the order of 5-10 Farads provides a backup power source. The capacitor is maintained within a predetermined voltage range by a resistively coupled trickle charge supplied by the telephone line. When the charge on the capacitor falls below a predetermined keep-alive level, a charge sense circuit operates a switch to bypass the trickle charge resistor and directly couples the phone line to the capacitor to thereby charge the capacitor to an acceptable level for memory operation.

A line test circuit is provided so that trickle charge resistor bypass is not permitted in the event of insufficient or excessive telephone line voltage. As a result, conversations held on extension telephones are not degraded and ringing current is not coupled into the keep-alive circuit.

The memory management circuit operates on a timer such that capacitor charge level is periodically checked. In this way, a minimal amount of current is required to operate the energy management circuit—on the order of less than 1 microampere. During periods of off-hook condition (telephone in use), charge current is coupled from the telephone lines through the telephone circuit and to the capacitor to maintain the capacitor's charge. If at any point, either during an on-hook or an off-hook condition, the level of current applied to the solid-state memory falls below a predetermined keep-alive level, the present invention provides keep-alive power to the memory from the capacitor, in addition to maintaining the capacitor in a "topped up" or ready condition.

Accordingly, the present invention solves the problem of loss of volatile memory contents during times of power interruption (such as when the phone lines go out), during long intervals of non-use, and in a multi-phone set environment, where significant amounts of charging current are not often available for maintaining a backup power source in a state of readiness. In this way, valuable information stored in the telephone memory (or in other such volatile electronic memories) is securely maintained intact during all possible operating conditions.

BRIEF DESCRIPTION OF THE FIGURES

FIG. 1 is a block diagram of a prior art telephone circuit including a prior art memory keep-alive device;

FIG. 2 is a block diagram of a telephone circuit including a memory keep-alive device according to the present invention; and FIG. 3 is a schematic diagram of a telephone circuit including the memory keep-alive device according to the present invention.

DETAILED DESCRIPTION OF A PREFERRED EMBODIMENT

A block diagram of a telephone circuit incorporating a preferred embodiment of the present invention memory keep alive device is shown in FIG. 2. A telephone line is coupled through an on hook/off hook switch 12' to a telephone set 11a'. The telephone set supplies 500 microamps through a telephone set power bus Udd. A memory device 13' is shown connected to the telephone set internal power bus.

A large value capacitor C2 supplies a keep alive current to memory device 13'. Capacitor C2 is typically a 5–10 farad device, such as manufactured by either Panasonic or NEC of Japan and marketed under the trademark GOLD SUPER CAPACITORS.

The telephone line typically provides equipment operating power in the range of 20–75 volts. Line power is supplied to capacitor C2 through a trickle charge resistor R2. The trickle charge resistor is chosen to provide no more than 5 microamps to the capacitor during on-hook (not in use) telephone operation. Memory device 13' is typically of the type that requires at least 2 milliamps to maintain the memory contents intact. During a telephone on-hook condition, the trickle charge provided by resistor R2 to capacitor C2 is insufficient to maintain a memory keep alive charge on capacitor C2 for long intervals. Accordingly, the capacitor is not able to maintain the memory contents intact with only a trickle charging power source.

When the phone circuit is off-hook (in use), line power is coupled via telephone set power bus Udd to memory device 13' to maintain the memory's contents intact. Line power is also coupled to capacitor C2 via the internal telephone power bus. Typically, 100 microamps are available to "top up" or charge capacitor C2.

The amount of power available for charging capacitor C2 in either the on-hook or the off-hook mode of operation depends upon the operation of other telephone extensions connected to the same telephone line in a phone installation. When other telephone sets are off-hook, additional power is drawn from the telephone line and there is therefore less available to charge capacitor C2.

The present invention provides a comparator 15 to monitor the charge on capacitor C2 and, in the event of an inadequate charge for maintaining the memory contents intact, to operate a transistor Q1 to bypass (short) trickle charge resistor R2. As a result, the full amount of line power available via the telephone lines is coupled directly to capacitor C2. In this way, a full charging current is provided to capacitor C2.

In the exemplary embodiment of the invention, capacitor C2 must supply at least 2.1 volts to memory device 13'. When the charge on capacitor C2 drops below this predetermined minimal level, comparator 15 senses a low charge condition. Comparator 15 provides a corresponding control signal which operates transistor Q1 to couple the line through the transistor to capacitor C2. The line is so coupled until capacitor C2 is charged to a selected upper voltage limit. In the exemplary embodiment of the present invention, the upper voltage limit is 3.9 volts. It should be appreciated that the upper and lower voltage limits are determined in accordance with the requirements of the memory devices that are to be kept alive. In the exemplary embodiment of present invention, CMOS memory devices are used because of their low power requirements. Other memory technologies may also be used with corresponding adjustments to the lower and upper voltage limits required to maintain the devices in an active condition, such that the memory contents are not lost during long intervals of inactivity and lack of direct connection to a continuous power source. It should also be appreciated that other embodiments of the invention may be produced that provide for substituting a rechargeable battery for capacitor C2; likewise, transistor Q1, resistor R2, and other circuit components may be provided as part of an integrated circuit in a monolithic version of the invention.

A schematic diagram of a telephone circuit including an exemplary embodiment of the present invention is shown in FIG. 3. Telephone set 11a' is shown coupled to a telephone line via a polarity correcting rectifier 16. On-hook/off-hook switch 12' provides line power, shown as current source I1, to the internal telephone power bus Udd when the telephone is off-hook. Power supplied by current source I2 is coupled through diode D2 to charge capacitor C2. Power provided to capacitor C2 is a "topping up" current. That is, during off-hook operation current source I2 supplies whatever line power is available after operating the telephone set and any extension telephone sets directly to capacitor C2. The line power supplied in this way is typically in excess of the line power provided via the trickle charge circuit, discussed above.

When the telephone set is on-hook, capacitor C2 provides keep alive power to memory device 13' through diode D1. Current is coupled from the telephone line from between rectifier 16 and on-hook/off-hook switch 12' through trickle charge resistor R2. As discussed above, an on-hook condition also provides line power to capacitor C2.

A comparator circuit consisting of comparators U3 and U4 monitors the voltage supplied by capacitor C1 to determine if the capacitor's charge is sufficient to maintain the contents of memory 13' intact (2.1 volts in the preferred embodiment of the invention). Comparators U3 and U4 also monitor an upper voltage limit which corresponds to a full capacitor charge (3.9 volts in the preferred embodiment of the invention). When a low voltage is sensed at capacitor C2 by comparator U4, a high signal output is clocked through flip flop 17. The signal output from flip flop 17, in turn, operates transistor switch Q1, which bypasses trickle charge resistor R2 and couples line power from the telephone line directly to capacitor C2.

When a full charge is sensed at capacitor C2, as indicated by an upper voltage limit (3.9 volts in the preferred embodiment of the present invention) as detected by comparator U3, flip flop 17 is again clocked and the signal output goes from high to low, turning off transistor switch Q1, and thereby removing the short circuit across trickle charge resistor R2. At this point, the only power supplied to capacitor C2 is a trickle charge provided via resistor R2.

It is not always desirable to bypass trickle charge resistor R2 and provide direct line power to capacitor C2. If an extension telephone set is off-hook, dialing or conversation may be degraded or otherwise subject to annoying interference as a result of directly coupling the line power to capacitor C2. If a ringing voltage is coupled directly to capacitor C2, it may also inadvertently be coupled to the memory device and other sensitive telephone set circuitry. Such ringing voltage typically exceeds the operating limits of such memory devices, and can damage or ruin them. To prevent these problems resulting from inadequate or excessive line power, a second comparator circuit, consisting of comparators U1 and U2, is provided. Comparator U1 senses an upper line voltage limit (75 volts in the exemplary embodiment of the present invention) and provides a low input to flip flop 17 in the event an upper line voltage limit is detected, as in the case of a ringing voltage. Comparator U2 senses a low line voltage limit and provides a low input to flip flop 17 in the event a low line voltage limit is detected, as in the case of an extension telephone set being off-hook. Detection of either a low voltage or a high voltage limit inhibits operation of the exemplary embodiment of the present invention.

An important purpose of the energy management circuit disclosed herein, efficient use of telephone line power, is defeated if the circuit itself draws too much power from capacitor C2 for operation. A sleep timer 18 is provided to maintain the present invention in an inactive condition during a selected interval of time. Periodically, the timer provides an enable signal to comparator circuits U1/U2 and U3/U4, which circuits then sense the voltage present at capacitor C2. The circuit is operated to charge capacitor C2, if necessary, and if sensed line voltages permit. When a low capacitor charge condition is detector and line power is connected directly to capacitor C2, the exemplary embodiment of the present invention operates as described above and continues to so operate until a sufficient charge is detected at capacitor C2. The control signal produced by flip flop 17 to operate transistor switch Q1 also inhibits operation of timer 18. This arrangement is shown by the lead line connected from the Q output of flip flop 17 to the EN line of timer 18.

It will be appreciated that timer 18 is a sleep timer which checks capacitor charge at chosen intervals. In the exemplary embodiment of the present invention, timer 18 checks voltage levels at the capacitor once every minute for 5-10 second intervals. Other such intervals may be chosen as are appropriate for the circuit to which the present invention is applied.

The foregoing was given for purposes of illustration and example. Various equivalent embodiments of the invention are possible. Among the various equivalent embodiments of the invention are monolithic versions of the exemplary circuit shown, incorporating all circuit components into a single integrated circuit; the substitution of a rechargeable battery for the capacitor; and the application of the present invention to devices other than telephones. Therefore, the scope of the invention should be limited only by the breadth of the claims.

I claim:

1. An energy managemnt ciruit for continuously supplying a volatile electronic memory with operating power to retain said memory's contents intact, comprising:
   a memory keep alive power source;
   a trickle charge power source coupled to maintain a charge on said memory keep alive power source;
   means for sensing said charge on said memory keep alive power source; and
   switch means, coupled to said sensing means and responsive thereto, for bypassing said trickle charge power source and for coupling a line power source directly to said memory keep alive power source when said memory keep alive power source charge is sensed to be below a selected level;
   further comprising sleep timer means for periodically supplying operating power to said sensing means and switch means to a selected interval and for periodically withholding operating power from said sensing mean and switch means for a selected interval to reduce overall circuit power consumption.

2. In a keep alive power source coupled to a volatile electronic memory, including a capacitor keep alive power supply for maintaining a continuous charge on said volatile electronic memory to retain said volatile electronic memory's content intact, and trickle charge means for constantly supplying a minimal amount of charging power to said capacitor keep alive power supply from a line power source, an energy management circuit, comprising:
   charge comparator means, coupled top said capacitor keep alive power source, for generating a charge control signal output when said capacitor charge is at less than a selected minimum voltage level within a selected charge range, and for terminating said control signal when said capacitor's charge is at a selected upper voltage level within said selected charge range; and
   switch means, couple to receive said control signal and responsive thereto to bypass said trickle charge means, such that said line power source is coupled to directly charge said capacitor backup power supply, further comprising:
   line comparator means, coupled to said line power source, for generating a charge inhibit signal output when said line power source is at less than or more than a selected minimum and maximum voltage level within an operating range; and
   second switch means, coupled to receive said inhibit signal and responsive thereto to inhibit the operation of said charge comparator means such that said line power source is not coupled direcly to said capacitor keep alive supply when said line power supply is not within said operating range.

3. In a keep alive power source coupled to a volatile electronic memory, including a capacitor keep alive power supply for maintaining a continuous charge on said volatile electronic memory to retain said volatile electronic memory's content intact, and trickle charge means for constantly supplying a minimal amount of charging power to said capacitor keep alive power supply from a line power source, an energy management circuit, comprising:
   charge comparator means, coupled to said capacitor keep alive power source, for generating a charge control signal output when said capacitor charge is at less than a selected minimum voltage level within a selected charge range, and for terminating said control signal when said capacitor's charge is at a selected upper voltage level within said selectd charge range; and
   switch means, coupled to receive said control signal and responsive thereto to bypass said trickle charge means, such that said line power source is coupled to directly charge said capacitor backup power supply;
   further comprising sleep timer means fopr periodically supplying operating power to said charge comparator means and switch means for a selected interval and for periodically withholding operating power from said charge comparator means and switch means for a selected interval to reduce overall circuit power consumption.

4. In a telephone circuit including a electronic memory, a memory keep alive power source, comprising:
- a large value capacitor for storing a keep alive power charge;
- a trickle charge resistor coupled to a telephone line power source to provide a charging current top said capacitor;
- a charge comparator coupled to said capacitor for generating a charge control signal output when said capacitor's charge is at less than a selected minimum voltage level within a charge range and for terminating said control signal when said capacitor's charge is at a selected operating voltage level within said charge range; and
- a transistor switch, coupled to receive said control signal and responsive thereto to bypass said trickle charge resistor, such that said line power source is coupled directly to said capacitor when said capacitor's charge is at less than the selected minimum voltag level; and until said capacitor's charge is stored to said operating voltage level;
- a line power source comparator coupled to said line power source is generating a charge inhibit signal when said line power source is at less than a selected minimum voltage level and when said line voltage is in excess of a selected maximum voltage level;
- switch means, responsive to said charge inhibit signal, for inhibiting operation of said transistor switch during intervals when said line power voltage is above or below said selected minimum and maximum voltage levels; and
- a sleep timer for periodically supplying operating power to said charge comparator, line power source comparator and switch means for a selected interval and for periodically withholding operating power from said circuit for a selected interval to reduce overall circuit power consumption.

5. The method of claim 4, further comprising periodically supplying operating power to said charge comparator, bypass switch and line comparator for a selected interval and for periodically withholding operating power from said charge comparator, bypass switch and line comparator for a selected interval to reduce overall circuit power consumption.

6. An energy management circuit for continuously supplying a volatile electronic memory with operating power to retain said memory's contents intact, comprising:
- a memory keep alive power source;
- a trickle down charge power source coupled to maintain a charge on said memory keep alive power source;
- means for sensing said charge on said memory keep alive power source;
- switch means, coupled to said sensing means and responsive thereto, for bypassing said trickle charge power source and for coupling a line power source direcly top said memory keep alive power source when said memory keep alive power source charge is sensed to be below a selected level; and
- line test means for inhibiting operation of said switch means when said line power source is not within a selected voltage level range.

7. In a keep alive power source for a volatile electronic memory including a capacitor keep alive power supply for maintaining a continuous charge on said memory to retain said memory's content intact, an energy management method, comprising:
- generating and constantly supplying a trickle charging current to maintain a memory keep alive charge on said capacitor keep alive power supply;
- generating a charge control signal with a charge comparator coupled to said capacitor keep alive power supply when said capacitor's charge is at less than a selected minimum voltage level within a selected voltage range;
- terminating said control signal when said capacitor's charge is at a selected operating voltage level within said selected voltage range;
- bypassing said trickle charging current with a bypass switch in response to said control signal such that a line power source is coupled directly to said capacitor keep alive power supply when said capacitor's charge is less than said selected minimum voltage level and until said capacitor's charge is at said selected operating voltage level;
- generating a charge inhibit signal with a line comparator coupled to monitor said line power source in response to said line power source being at less than a selected minimum voltage level or at more than a selected maximum voltage level within a selected line power source voltage range; and
- inhibiting operation of said bypass switch by operating an inhibit switch in response to said charge inhibit signal, whereby said line power source is not coupled directly to said capacitor in the event of insufficient or excessive line power source voltage level.

8. An energy management circuit for continuously supplying a volatile memory in a telephone adapted to be coupled to a telephone line with back-up operating power to retain said memory's contents intact during on-hook conditions, comprising:
- means for providing power to said memory from said telephone line when telephone is off-hook;
- a memory keep alive power source coupled to provide back-up power to said memory during said on-hook conditions;
- a trickle charge power source coupled to maintain a charge on said memory keep alive power source;
- means for sensing said charge on said memory keep alive power source; and
- switch means, coupled to said sensing means and responsive thereto, for uncoupling said trickle charge power source and for coupling a line power source directly to said memory keep alive power source when said memory keep alive power source is sensed to be below a selected level.

9. The circuit of claim 8 further comprising line test means for inhibiting operation of said switch means when said line power source is not within a selected voltage level range.

10. The circuit of claim 8, further comprising sleep timer means for periodically supplying operating power to said sensing means and switch means for a selected interval and for periodically withholding operating power from said sensing means and switch means for a selected interval to reduce overall circuit power consumption.

* * * * *